United States Patent
Neuberger et al.

(10) Patent No.: US 6,208,781 B1
(45) Date of Patent: Mar. 27, 2001

(54) FIBER OPTIC TRANSMISSION SYSTEM FOR HIGH POWER LASER

(75) Inventors: Wolfgang Neuberger, F. T. Labaun (MY); Alexander Kharschak, Im Baumkamp (DE)

(73) Assignee: CeramOptec Industries Inc., East Longmeadow, MA (US)

( * ) Notice: Subject to any disclaimer, the term of this patent is extended or adjusted under 35 U.S.C. 154(b) by 0 days.

(21) Appl. No.: 09/115,057

(22) Filed: Jul. 14, 1998

(51) Int. Cl.[7] .................... G02B 6/26; G02B 6/16
(52) U.S. Cl. .................... 385/31; 385/123; 65/385
(58) Field of Search .................... 385/123–128, 385/31, 38, 34

(56) References Cited

U.S. PATENT DOCUMENTS

| | | | |
|---|---|---|---|
| 4,205,901 | * 6/1980 | Ramsay et al. | 385/124 |
| 4,641,912 | 2/1987 | Goldenberg | 385/43 |
| 5,011,254 | 4/1991 | Edwards et al. | 385/33 |
| 5,602,947 | * 2/1997 | Neuberger | 385/31 |
| 5,751,871 | 5/1998 | Krivoshlykov et al. | 385/33 |

* cited by examiner

Primary Examiner—John D. Lee
Assistant Examiner—Michelle R. Connelly-Cushwa
(74) Attorney, Agent, or Firm—Bolesh J. Skutnik; B J Associates

(57) ABSTRACT

A fiber optic transmission system for high laser power transmission is described. A micro-structure, whose pre-determined features are characterized by a preferred shape, depth, and peak-to-peak distance, is introduced into an input end surface of an optical fiber. Such micro-structure reduces Fresnel reflection at the modified optical fiber end surface improving the damage threshold at the surface. Micro-structuring of the optical fiber output end surface in a similar fashion further enhances transmission of high laser powers. A method is disclosed where the optical fiber end surfaces are structured into a pre-determined micro-structure by a suitable stamp. The micro-structure increases the damage threshold of each optical fiber end surface, raising it closer to the theoretical damage threshold of the material within the fiber and thereby increases transmission of high laser power density that is available at a work or treatment site.

3 Claims, 5 Drawing Sheets

FIBER OPTIC TRANSMISSION SYSTEM FOR HIGH POWER LASER

BACKGROUND OF THE INVENTION

1. Field of the Invention

The present invention relates to transmission of high laser power densities through modification of optical fiber end surfaces, thereby increasing the damage threshold of the system and increasing the power density available at a work or treatment site. In particular, the modifications involve micro-structuring the optical fiber end surfaces.

2. Information Disclosure Statement

High power laser systems of up to 6 kW are currently available for several manufacturing tasks, such as laser cutting, welding, and marking and even higher power systems are under development. High laser beam power density is a critical requirement for these tasks and the transmission of this laser energy over long (up to several hundred meters) distances is required to share costly laser sources between work stations on a manufacturing line.

Since laser power density is inversely proportional to the beam cross section, optical fibers with small core cross sections are needed to transmit the highest power density available to a work or treatment site although the maximum power density is limited by the power source. The launch of high laser power density into increasingly smaller optical fiber cross sections creates problems such as destruction of the optical fiber end surfaces. This destruction results from several phenomena. First, the absorption at the end surface of even a very pure optical fiber material is substantially higher than the absorption throughout its volume. This surface absorption is intensified during the manufacturing tasks described above because materials surrounding the output end surface tend to absorb laser light at that frequency.

Second, due to the physics of light reflection between materials having different refractive indices, the power density near the input and output surfaces becomes concentrated. That is, an incident laser beam wave (having an amplitude $A_i$) that leaves a first media (with a refractive index $n_1$) and perpendicularly enters a more dense media (with a refractive index n) will generate interference in the form of a reflected wave with an amplitude $A_r$. This results in a refracted or transmitted wave having an amplitude $A_o$ ($A_o=(A_i-A_r)$). The power density at the end surface is proportional to the square of $A_o$ ($A_o^2=(A_i-A_r)^2$). For a wave traveling from the more dense media, the amplitudes of the incident and reflected waves are compounded, and thus, the intensity of the laser radiation in the output end surface layer is proportional to $A_o^2=(A_i+A_r)^2$. The difference in power density near the input and output end surfaces quickly grows according to the refractive index ratio $n/n_1$ because of the light reflected from the end surfaces quantified by intensity R where $R=(n/n_1)^2 \approx ((n-n_1)/(n+n_1))^2$. Thus reflective losses greatly contribute to laser induced damage.

Due to the above problems, damage thresholds of optical fiber end surfaces are considerably lower than the theoretical internal damage threshold which is defined as equivalent to the bond strength of the optical material. For example, the theoretical damage threshold for $SiO_2$ is 10–50 $GW/cm^2$ which correlates to the Si—O bond strength.

Means to increase the damage threshold of optical fiber end surfaces have previously been suggested. Goldberg et al. proposes decreasing the apparent density of energy at the optical fiber end surface by using a funnel shaped input end or a water filled cavity at the input end (U.S. Pat. No. 4,641,912). The increased area of the funnel shaped energy coupler decreases the input power density for a given level of power within the optical fiber. By decreasing the cross sectional area of the optical fiber after the energy has been coupled in, the density of the power can then be increased. However, although the apparent density of energy at the input surface is somewhat reduced, the Fresnel reflection losses remain constant.

Fabrication of a spherical micro-lens directly on the optical fiber by manufacturing a taper on the fiber end, cutting the taper at a specific distance, and melting its end to provide a spherical shape, can also increase transmittance (U.S. Pat. No. 5,011,254). This prior art is illustrated in FIG. 1. High laser power density radiation 10 is launched at thermally deformed input end 14 and radiation is guided along core 12 whose diameter is smaller than deformed input end 14. This arrangement simplifies the system and minimizes the number of optical interfaces between laser and optical fiber, but the method is very operator dependent, difficult to reproduce, and does not provide a high quality spherical surface on the fiber end surface.

Other known methods of shaping optical fiber end faces are based on polishing techniques. FIG. 2 presents a further example of prior art where a thermally deformed input end 24 is polished. High laser power density radiation 20 is launched towards thermally deformed input end 24 that has been polished flat to end surface 26. Radiation is guided along core 22 whose diameter is smaller than thermally deformed input end 24. The polishing procedure is difficult to control and may fail to provide an optimal shape on the optical fiber end surface which can lead to increased reflection losses. Ideally, a surface on the optical fiber end surface should have a hyperbolic shape in the direction corresponding to that of large beam divergence while a typical polishing technique provides a primarily spherical optical surface (US. Pat. No. 5,751,871).

U.S. Pat. No. 5,602,947 issued to Wolfgang Neuberger and hereinafter incorporated by reference discloses a method for providing micro-voids that make a optical fiber end surface substantially non-reflective, thereby decreasing Fresnel reflection losses for a predetermined wavelength. However, the optical fiber material must have similar mechanical and thermal properties to those of the mid-IR fibers. Additionally, in the mid-IR region, micro-structures can be significantly larger and easier to manufacture than micro-structures in the 1 $\mu$m range where high power solid state lasers and quartz glass fibers typically operate.

Reflection losses can also be decreased by depositing a anti-reflective coating on the surface of the highly reflective material. However, in practice, such a technological operation is complicated, time-consuming and expensive. Additionally, most anti-reflective coating films are very delicate and sensitive to possible contamination during the depositing process. There is thus a need for a laser transmission system that improves on the state of the art by allowing increased high laser power density transmission, and thereby providing increased power density available for manufacturing tasks such as laser cutting, welding, and marking.

OBJECTS AND SUMMARY OF THE INVENTION

It is therefore an object of the present invention to provide a system that increases transmission of high laser power density by increasing the damage thresholds of the optical fiber end surfaces.

Another object of the present invention is to provide for the efficient transmission of high laser power density to a treatment or work site while maintaining laser beam quality.

A further object of the invention is to maximize the transmittable power density by minimizing the loss due to Fresnel reflection and optical fiber end surface damage.

Briefly stated, the present invention provides a fiber optic transmission system for high laser power transmission. A micro-structure, whose pre-determined features are characterized by a preferred shape, depth, and peak-to-peak distance, is introduced into an input end surface of an optical fiber. Such micro-structure reduces Fresnel reflection at the modified optical fiber end surface improving the damage threshold at the surface. Micro-structuring of the optical fiber output end surface in a similar fashion further enhances transmission of high laser powers. A method is disclosed where the optical fiber end surfaces are structured into a pre-determined micro-structure by a suitable stamp. The micro-structure increase the damage threshold for each optical end surface, raising it closer to the theoretical damage threshold of the material within the fiber and thereby increases transmission of high laser power density that is available at a work or treatment site.

The above, and other objects, features, and advantages of the present invention will become apparent from the following detailed description read in conjunction with the accompanying drawings.

DETAILED DESCRIPTION OF PREFERRED EMBODIMENTS

Figure 1:
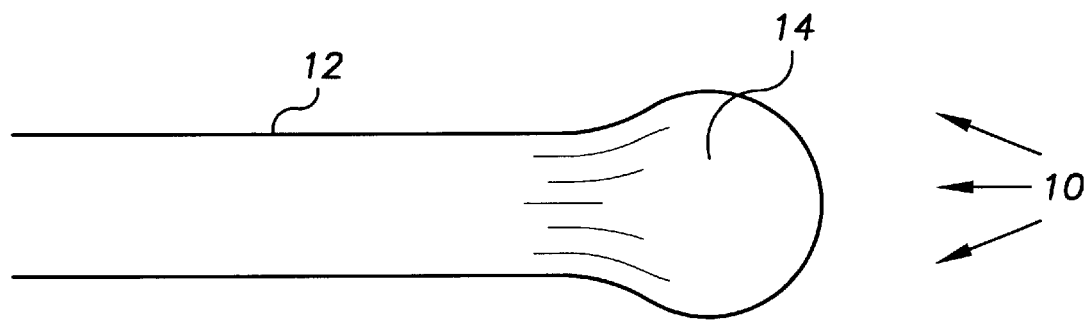
FIG. 1 illustrates a conventional state of the art thermally deformed input end.

Power density is a measure of a beam of radiant energy corresponding to unit energy flowing across unit area in unit time. For example, the theoretical power handling capability of a silica optical fiber corresponds to the Si—O bond strength which is 10–50 $GW/cm^2$. Therefore at a bond strength of 10 $GW/cm^2$ for a 200 micron optical fiber, a theoretical maximum of $3.1415 \times 10^6$ watts may be transmitted at any one time. However, the actual transmission in industrial applications, such as laser cutting, welding, and marking, is limited to approximately 6 kW. The optical fiber core cross sectional size and this state of the art maximum power handling capability can be used to determine power density by the following equation:

$$\text{Power Density} = \text{Power/area} = W/cm^2 \qquad (1)$$

For example, an optical fiber with an 800 micron core diameter transmitting state of the art powers has a power density of:

$$\text{Power Density} = \text{Power/area} = (6000 \text{ W})/\pi(0.04 \text{ cm})^2 = 1.19 \text{ MW/cm}^2$$

Similarly, an optical fiber with a 1000 micron core diameter has a power density of:

$$\text{Power Density} = \text{Power/area} = (6000 \text{ W})/\pi(0.05 \text{ cm})^2 = 0.764 \text{ MW/cm}^2.$$

Losses due to Fresnel reflections can be estimated by the relationship:

$$R = (n_m - N)^2 / (n_m + N)^2 \qquad (2)$$

where R is the amount of reflection loss, $n_m$ is the refractive index of the medium, and N is the refractive index of the optical material. If air is the medium having a refractive index equal to 1, Equation 2 reduces to:

$$R = (1-N)^2 / (1+N)^2 \qquad (3)$$

For example, an optical fiber with a pure silica core has a refractive index of 1.458 at the D (Na) line 589.3 nm. This results in loss due to Fresnel reflections of:

$$R = (1-1.458)^2 / (1+1.458)^2 = 0.03477 \text{ or } 3.477\%.$$

The power density for a given optical fiber can be determined by equation (1) and determination of loss due to Fresnel reflection is estimated by equation (2). If air is the medium that is in contact with the optical material, Fresnel reflection losses can be estimated by equation (3).

Similarly, the same calculations can be made using the Nd:YAG line (1064 nm) for comparison. At this wavelength, the refractive index is 1.450 for an optical fiber having a pure silica core, and results in loss due to Fresnel reflections of:

$$R = (1-1.450)^2 / (1+1.450)^2 = 0.03369 \text{ or } 3.369\%.$$

The different optical fiber sizes and different wavelengths (different refractive indices) can be compared. As optical fiber size is decreased, the changes in power handling capability become more substantial, so a small decrease in core cross section yields a greater increase in capability. Also, the larger the difference between the refractive index of the medium and optical material, the larger the amount of Fresnel reflection.

Clearly there is a lot of room to gain towards reaching theoretical maxima. The present invention, based on wave optics rather than ray (geometrical) optics, takes a step in that direction by increasing energy transmission through the optical fiber end surfaces at every power level. The actual maximum transmittable power density is raised closer to the theoretical transmittable power density by decreasing Fresnel reflections. Increased energy can thus be captured by the optical fiber end surface and transmitted through the fiber. In operation, the decreased reflections at the micro-structured optical fiber end surface permit an increase in the power and power density transmitted through the fiber.

Figure 2:
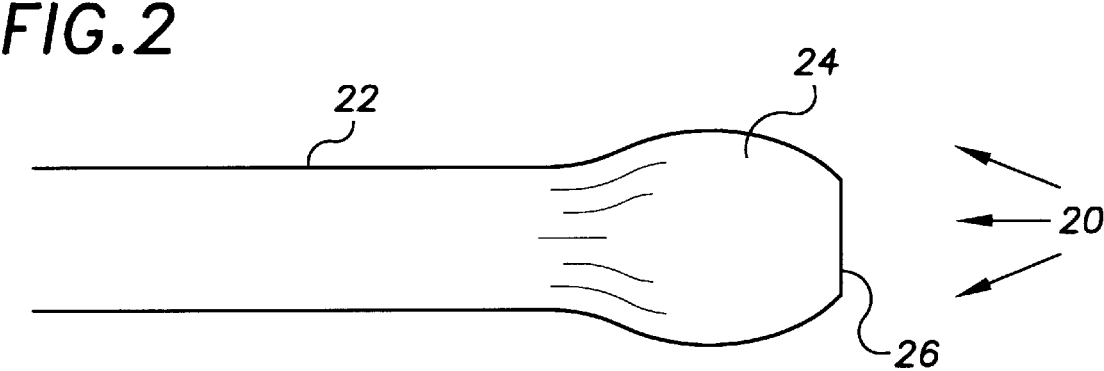
FIG. 2 illustrates the input end shown in FIG. 1 polished to a flat surface.

The present invention describes a new device that builds upon and improves state of the art shown in FIG. 2

Figure 3:
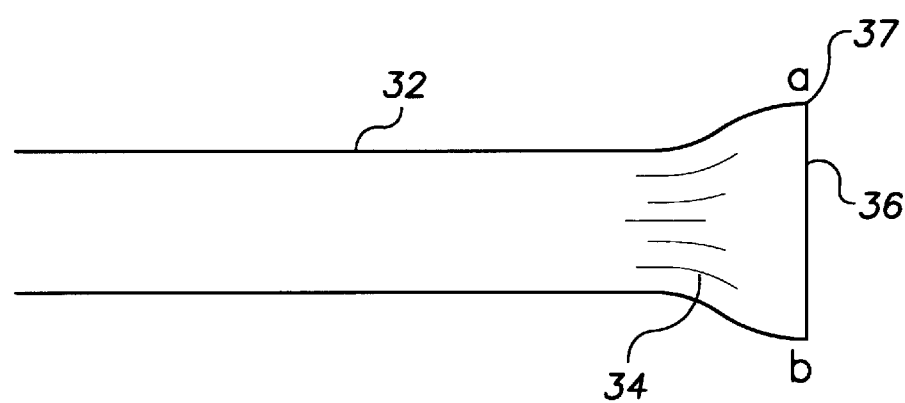
FIG. 3 shows the input end shown in FIG. 1 polished to a flat surface at an optimal position of the thermally deformed input end.

(discussed supra). FIG. 3 illustrates a preferred embodiment where optical fiber 32 has thermally deformed input end 34 with a cross sectional area larger than cross sectional area of optical fiber 32. Thermally deformed input end 34 is not merely polished flat 36 similar to 26 of FIG. 2, but is polished flat 36 perpendicular to a long axis of optical fiber 32. This can lead to the largest optimally sized flat surface 36 that is perpendicular to the long axis.

Figure 4A:
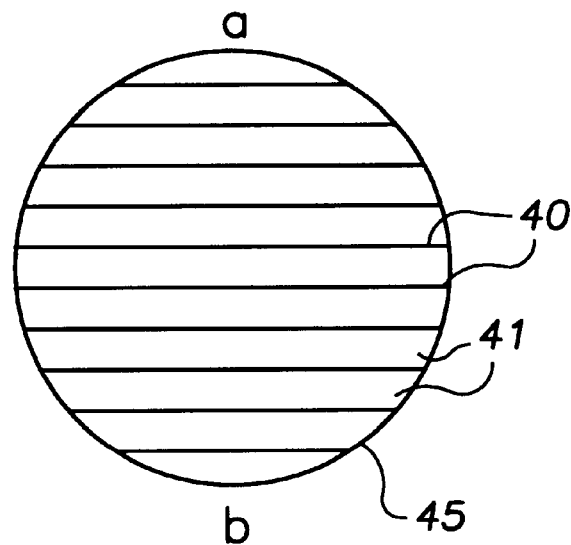
FIG. 4a displays a head on view of an embodiment having a one dimensional sinusoidal micro-structure.
Figure 4B:
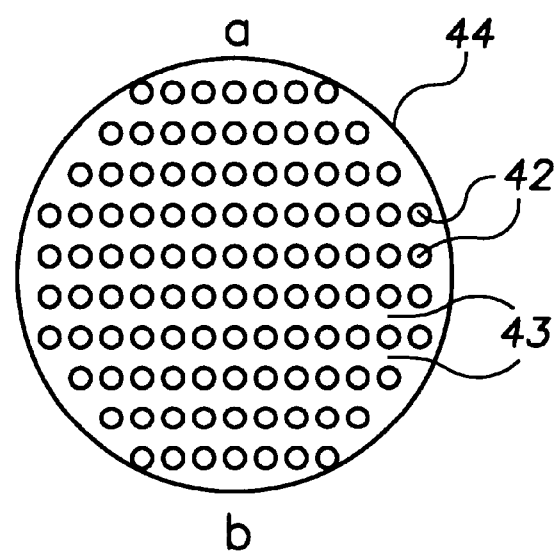
FIG. 4b represents a head on view of a preferred embodiment having a two dimensional sinusoidal micro-structure.

In a particularly preferred embodiment, this flat surface 36 is then structured to a one or two dimensional sinusoidal micro-structure shown in FIG. 4. FIG. 4a displays the head on view of an embodiment having essentially a one dimensional sinusoidal micro-structure end surface 45 with peaks 40 and valleys 41. FIG. 4b shows a preferred embodiment having essentially a two dimensional sinusoidal micro-structure end surface 44 with peaks 42 and valleys 43. End surfaces 44 and 45 are both micro-structured at the optimal flat surface corresponding to 37 of FIG. 3.

Figure 5:
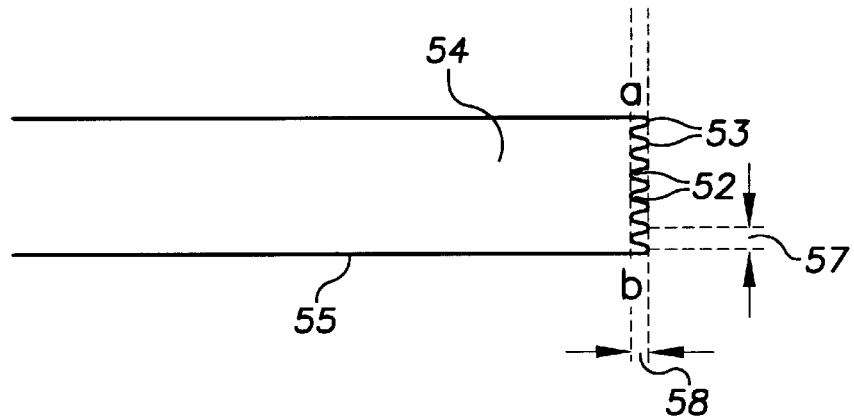
FIG. 5 shows a side cut cross sectional view of a preferred embodiment having a sinusoidal micro-structure.

Another embodiment having essentially a sinusoidal nature is illustrated in FIG. 5. Input end 54 of optical fiber 55 is shown in cross sectional view with a sinusoidal micro-structure having peaks 53 and valleys 52. The period 57 of the sinusoidal features, a measure of distance between centers of two adjacent peaks, are of a finer size than the operating wavelength of the chosen laser, up to 10 times smaller than state of the art. A micro-structured end can improve transmission at every power level and wavelength although the greatest advantage will naturally be for high power lasers, particularly the high power YAG laser which operates at 1064 nm.

Roughly speaking, the preferred depth 58 of sinusoidal features, defined as the perpendicular distance from the surface of peak 53 down to the lowest point of valley 52, can be more or less estimated by:

$$2d \cos \theta = \lambda_o/2 \qquad (4)$$

where $\lambda_o$ is the pre-selected operating wavelength for total cancellation of interference, $\theta$ is the angle of incidence, and d is preferred depth 58. For orthogonal rays as an example, preferred depth 58 of peaks 53 more or less is, $$d = \lambda_o/4 \qquad (5)$$

For example, at a predetermined wavelength of 1064 nm, preferred depth 58 of approximately 266 nm should be used. Exact preferred depths can be calculated by a suitable software program.

It is not necessary to thermally deform or polish optical fiber 55 to achieve increased transmission of high laser power density. Rather, it is the introduction of a microstructure into optical fiber input end 54 that enhances transmission of high laser power density although transmission may be heightened by first thermally deforming and/or polishing the optical fiber input end surface.

Figure 6:
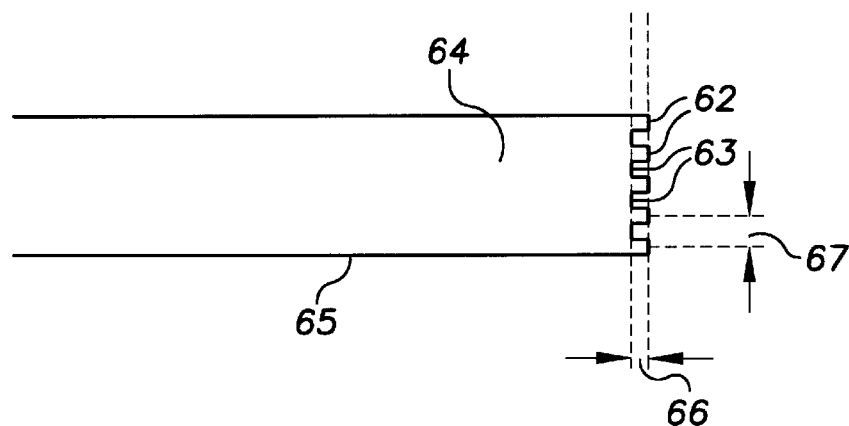
FIG. 6 illustrates a side cut cross sectional view of an embodiment having a stepped micro-structure FIG. 7 displays a side cut cross sectional view of an embodiment having a Trapezoidal micro-structure.

Preferred depth may also be achieved using other geometrical micro-structures. For example, another embodiment of the present invention is shown in FIG. 6. Optical fiber 65 has an input end 64 that is modified essentially to a one or two dimensional stepped microstructure having peaks 62 and valleys 63. The micro-structured steps have an preferred depth 66 and stepped period 67, where preferred depth 66 is defined as the perpendicular distance from the surface of stepped peak 62 down to the lowest point of valley 63, and period 67 is the distance between the centers of two adjacent peaks 62.

Figure 7:
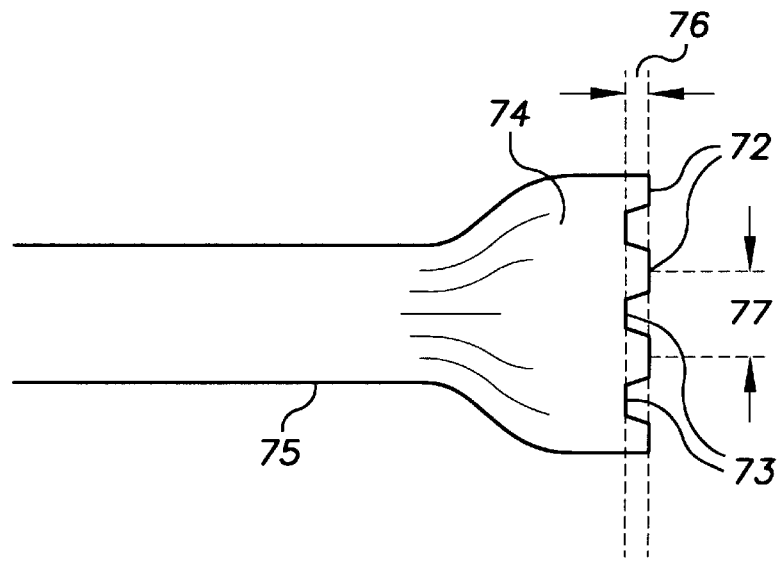

Still another embodiment of the present invention is displayed in FIG. 7. Thermally deformed input end 74 of optical fiber 75 is modified essentially to a one or two dimensional trapezoidal micro-structure at the largest diameter 71 corresponding to 37 of FIG. 3. The trapezoidal micro-structure having peaks 72 and valleys 73, has an preferred depth 76 and trapezoidal period 77, where preferred depth 76 is defined as the perpendicular distance from the surface of trapezoidal peak 72 down to the lowest point of valley 73, and period 77 is the distance between the centers of two adjacent peaks 72.

Similar to the sinusoidal features described above, the stepped and trapezoidal features are of a smaller size than the operating wavelength, up to 10 times smaller than state of the art. Additionally, the preferred depth for these micro-structures can also be roughly determined by equation (5) so that for a wavelength of 1064 nm, the preferred depth remains approximately 266 nm. In all embodiments of the present invention, micro-structuring of the optical fiber output end surface in a similar fashion further enhances transmission of high laser powers.

Figure 8:
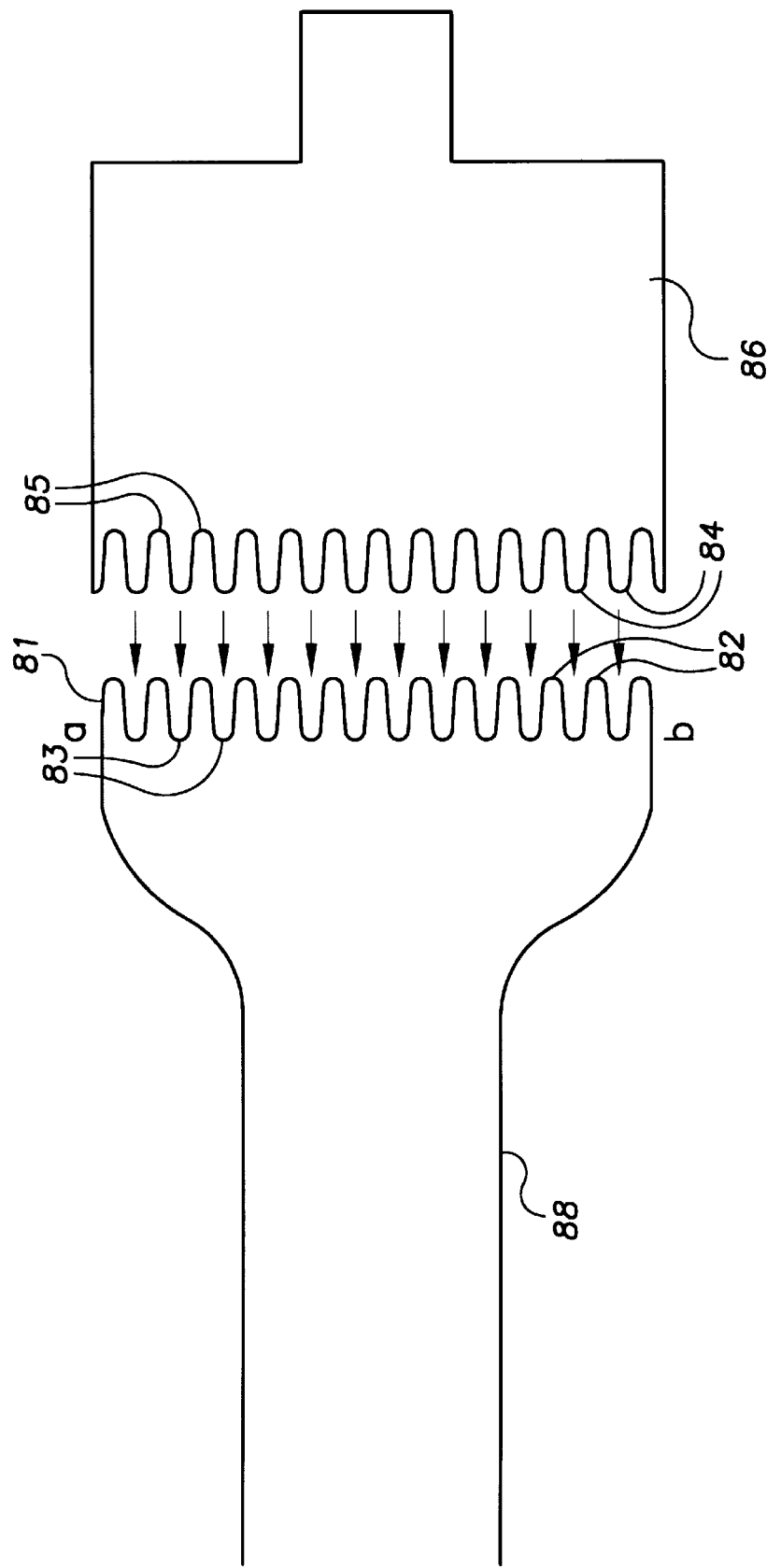
FIG. 8 exhibits a further embodiment having a sinusoidal micro-structure and a complementary stamp used to create the sinusoidal micro-structure.

It is an essential element of the present invention to identify a suitable micro-structure manufacturing method employable for silica fibers. A method for creating the micro-structured optical fiber end surfaces such as those shown in FIG. 4–7 is provided which increases transmission of high laser power density through an optical fiber. FIG. 8 helps describe a typical method of creating a micro-structure through exhibition of an embodiment having a sinusoidal micro-structure and a complimentary stamp 86 used to create the sinusoidal micro-structure. Stamp 86 is pressed into thermally deformed optical fiber end 87 of optical fiber 88 at largest diameter 81 corresponding to 37 of FIG. 3. Stamp 86 has been formed with suitable negative peaks 84 and valleys 85 pre-determined for a pre-selected operating wavelength of a chosen laser. When both stamp 86 and thermally deformed input end 87 are heated above optical fiber 88 core softening temperature, stamp 86 is pressed into heated thermally deformed input end 87. This intimate contact creates complimentary sinusoidal peaks 82 and valleys 83 in thermally deformed input end 87. Peaks 84 on stamp 86 form complimentary valleys 83 on thermally deformed input end 87. Congruently, valleys 85 on stamp 86 create complimentary peaks 82 on thermally deformed input end 87. The stepped micro-structure shown in FIG. 6 and trapezoidal micro-structure shown in FIG. 7 can be manufactured in a similar manner with a suitably configured stamp. In each case the stamp is designed with a pre-selected operating wavelength in mind to yield maximum transmission of high laser power densities at the pre-selected operating wavelength.

Many methods can be envisioned of a preferred embodiment utilizing a suitably configured stamp to create the micro-structures shown in FIGS. 4–7. For example, the stamp and optical fiber input end surface can be brought together by a spring system so that the stamp creates positive pressure on the optical fiber end surface and vice versa. The system is then heated above the optical fiber core softening temperature and the optical fiber material will begin to flow into the valleys of the stamp such as 85 of FIG. 8, thereby creating peaks on the fiber end surface such as 53, 62, and 73 of FIGS. 5, 6, and 7 respectively. After the optical fiber material has entirely filled the valleys of the stamp, the temperature of the system is decreased and the stamp can then be removed.

Additional methods of creating the modified end surface include heating both the stamp and optical fiber end surface above the optical fiber core softening temperature, and subsequently bringing them into contact. Also, the stamp could be positioned vertically and the optical fiber end surface directly above the stamp so that when the system is heated above a threshold temperature, gravity aids in the flow of the optical fiber material into the pattern of the stamp. In any case, after the optical fiber material has filled the cavity of a stamp, the system may be cooled and the stamp can be removed.

Figure 9:
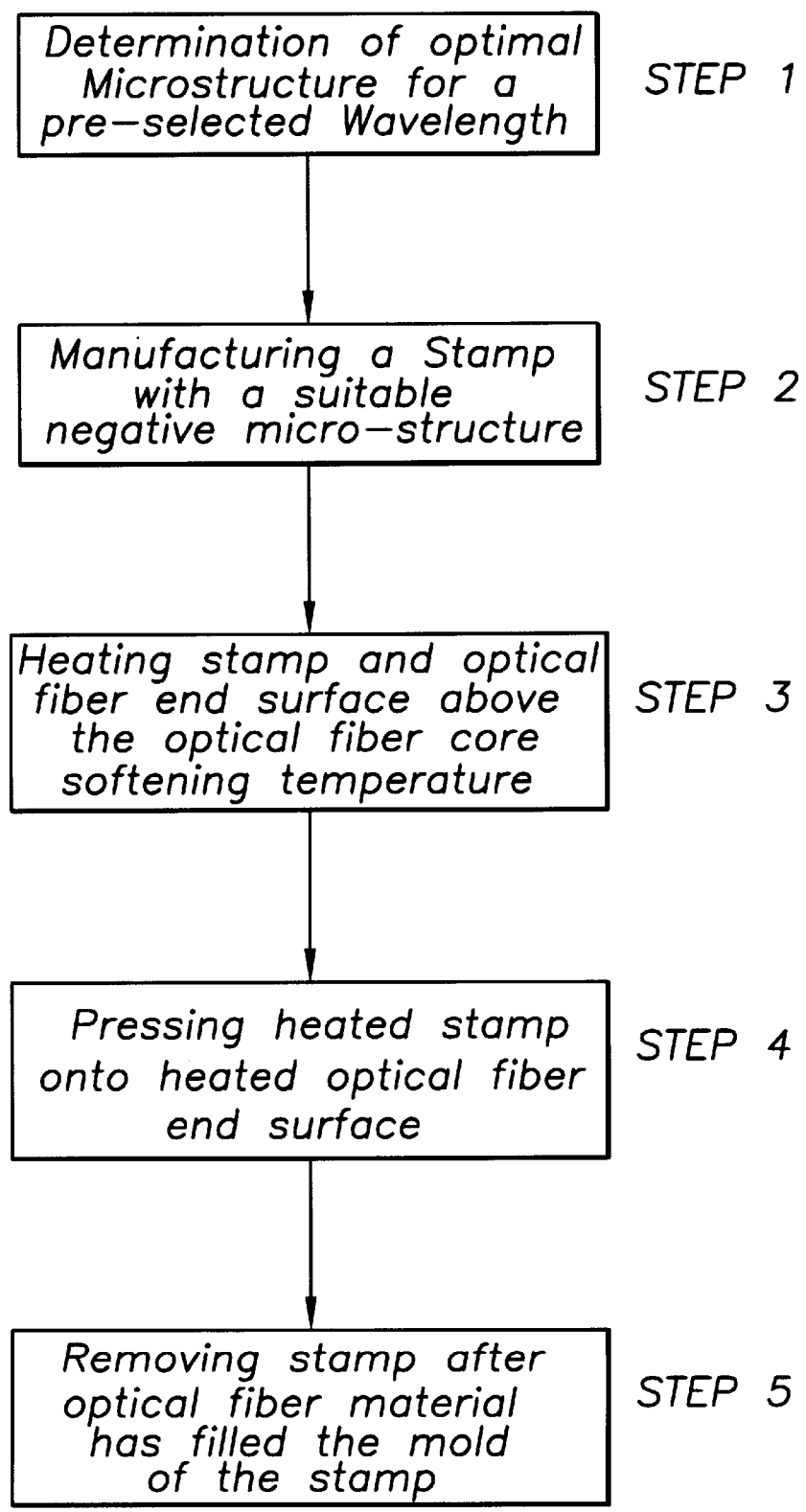
FIG. 9 shows a schematic description of a typical method in manufacturing optimal micro-structures.

FIG. 9 shows a schematic description of a method of creating the micro-structured optical fiber end surface of the present invention. Step 1 involves a determination of optimal micro-structure features for a pre-selected operating wavelength of the chosen laser. In step 2, a stamp is manufactured with suitable complimentary optimal micro-structure features. Step 3 involves heating the stamp and the optical fiber input end surface above the optical fiber core softening temperature and in step 4, the heated stamp is pressed onto the heated optical fiber input end surface. Step 5 completes the method by removing the stamp after the optical fiber material has filled the pattern of the stamp. The method schematically described in FIG. 9 can similarly create a micro-structure on an optical fiber output end surface. Additionally, steps 3 through 5 may be completed after the optical end surface has been thermally deformed and polished perpendicular to a long axis of the optical fiber.

A preferred embodiment includes substantially silica as the optical fiber material and Molybdenum as the stamp material. Molybdenum is a very hard metal that is often used to make alloy steel because small amounts cause tremendous increases in hardness and strength. The extremely high melting point of Molybdenum (2623° C.) makes it very useful as a stamp material because it remains very hard at virtually all core softening temperatures. Additionally, Molybdenum's high $\Delta H_{fus}$=390.7 J/g allows increased stability of the extremely small negative micro-structures on the surface of the stamp.

A particularly preferred embodiment of modifying an optical fiber end surface includes stamping with a suitably structured Molybdenum stamp within a protective Hydrogen atmosphere. When heating Molybdenum in air, a trioxide ($MoO_3$) may be obtained. Thus, by using an Oxygen free atmosphere such as Hydrogen, there is less potential for introducing impurities onto the optical fiber end surface and oxidation of the stamp is prevented. The manufacturing method of the present invention can be used to introduce as small as 1 μm micro-structures onto a silica fiber and allows increased transmission of high laser power density.

One skilled in the art recognizes that the optical fiber core material may be pure silica or doped with Germanium or other refractive index raising materials possibly in combination with lower refractive index materials such as Phosphorus or Boron. Additionally, the micro-structure may be manufactured by other means such as micro-machining techniques without going beyond the scope of the present invention.

Having described preferred embodiments of the invention with reference to the accompanying drawings, it is to be understood that the invention is not limited to these precise embodiments, and that various changes and modifications may be effected therein by one skilled in the art without departing from the scope or spirit of the invention as defined in the appended claims.

What is claimed is:

1. A fiber optic transmission system for high laser power transmission comprising:

at least one optical fiber having a core, a cladding and a cross sectional area, and having an input end and an output end, and each end having an end surface and a cross sectional area;

said at least one optical fiber consisting of an optical material which is transparent over a spectral region including wavelengths emitted by a chosen laser;

wherein said optical material of said optical fiber is substantially silica;

at least said input end being thermally deformed and having an expanded cross sectional area compared to said cross sectional area of said optical fiber;

at least said input end further having a micro-structured end surface whose features are pre-determined for a pre-selected operating wavelength of said chosen laser;

wherein said end surface of said thermally deformed input end has been polished flat perpendicular to a long axis of said optical fiber and presents an optimally sized flat surface for accepting output from a laser source;

said features being characterized by a preferred depth, a peak to peak distance, and a shape; and said preferred depth and said peak to peak distances on said micro-structured end surface being smaller than said pre-selected operating wavelength of said chosen laser.

2. A fiber optic transmission system according to claim 1 further comprising an output end having a micro-structured end surface with features pre-determined for a pre-selected wavelength, and said features being essentially similar to features on said input end surface.

3. A fiber optic transmission system according to claim 1 wherein said preferred depth has an value, d, roughly determined by:

$$d=\lambda_o/4$$

where $\lambda_o$ is said pre-selected operating wavelength of a chosen laser and d is said preferred depth of said micro-structured end surface.

* * * * *